United States Patent
Park

(10) Patent No.: US 9,421,930 B2
(45) Date of Patent: Aug. 23, 2016

(54) APPARATUS AND METHOD FOR PROTECTING VEHICLE PASSENGER

(71) Applicant: HYUNDAI MOBIS CO., LTD., Seoul (KR)

(72) Inventor: Tae Won Park, Yongin (KR)

(73) Assignee: HYUDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/621,150

(22) Filed: Feb. 12, 2015

(65) Prior Publication Data

US 2016/0137152 A1    May 19, 2016

(30) Foreign Application Priority Data

Nov. 14, 2014  (KR) .................. 10-2014-0158940

(51) Int. Cl.
- *B60R 21/00* (2006.01)
- *B60R 21/0132* (2006.01)
- *G01P 15/00* (2006.01)
- *B60R 21/01* (2006.01)

(52) U.S. Cl.
CPC ........... *B60R 21/0132* (2013.01); *G01P 15/001* (2013.01); *B60R 2021/01286* (2013.01); *B60R 2021/01327* (2013.01)

(58) Field of Classification Search
USPC .............. 701/45, 48; 180/271, 274, 282, 283, 180/284, 286
See application file for complete search history.

(56) References Cited

U.S. PATENT DOCUMENTS

| | | | | |
|---|---|---|---|---|
| 5,767,766 A | * | 6/1998 | Kwun | B60R 21/0136 180/282 |
| 6,170,864 B1 | * | 1/2001 | Fujita | B60R 21/013 280/735 |
| 6,223,125 B1 | * | 4/2001 | Hall | G08G 1/164 701/117 |
| 6,512,969 B1 | * | 1/2003 | Wang | B60R 21/0132 180/232 |
| 7,848,885 B2 | * | 12/2010 | Hayasaka | B60R 21/0132 180/274 |

(Continued)

FOREIGN PATENT DOCUMENTS

| KR | 10-0636639 B1 | 10/2006 |
|---|---|---|
| KR | 10-2011-0128662 A | 11/2011 |
| KR | 10-2013-0031641 A | 3/2013 |

*Primary Examiner* — Thomas Tarcza
*Assistant Examiner* — Richard Goldman

(57) ABSTRACT

The present specification relates to an apparatus for protecting a vehicle passenger, and the apparatus for protecting a vehicle passenger according to an exemplary embodiment of the present specification includes: a front two-axis sensor; a first side two-axis sensor; a second side two-axis sensor; a control unit which determines whether the vehicle passenger is in a front collision situation, by calculating an average value of acceleration values, or determines whether the vehicle passenger is in a broadside collision situation, by calculating speed and a speed change of the first side two-axis sensor using the acceleration value obtained by the sensor unit and by calculating speed of the second side two-axis sensor; and a protection unit which protects the vehicle passenger based on the determination of the control unit.

16 Claims, 8 Drawing Sheets

(56) References Cited

U.S. PATENT DOCUMENTS

| | | | | |
|---|---|---|---|---|
| 9,254,803 B2* | 2/2016 | Park | ................... | B60R 21/0132 |
| 2002/0156561 A1* | 10/2002 | DeBoni | ............. | B60G 17/0195 |
| | | | | 701/48 |
| 2003/0006592 A1* | 1/2003 | Yasuhara | .............. | B60R 21/213 |
| | | | | 280/730.2 |
| 2003/0034754 A1* | 2/2003 | Sethi | ...................... | G05G 1/405 |
| | | | | 318/801 |
| 2006/0290113 A1* | 12/2006 | Bernat | ................. | B60R 21/231 |
| | | | | 280/730.1 |
| 2009/0008915 A1* | 1/2009 | Baumann | ............ | B60R 21/0132 |
| | | | | 280/734 |
| 2009/0138250 A1* | 5/2009 | Thomas | .............. | G06F 17/5095 |
| | | | | 703/6 |
| 2012/0221211 A1* | 8/2012 | Lich | .................... | B60R 21/0136 |
| | | | | 701/46 |
| 2013/0035827 A1* | 2/2013 | Breed | ................ | B60R 21/0132 |
| | | | | 701/45 |
| 2013/0331056 A1* | 12/2013 | McKown | ................ | H04W 4/22 |
| | | | | 455/404.1 |
| 2014/0288727 A1* | 9/2014 | Everhart | ................. | G07C 5/00 |
| | | | | 701/1 |
| 2015/0112552 A1* | 4/2015 | Okamura | ............ | B60R 21/0132 |
| | | | | 701/45 |
| 2015/0151702 A1* | 6/2015 | Park | ................... | B60R 21/0132 |
| | | | | 701/45 |

* cited by examiner (a)

(b)

LOW SEVERITY COLLISION /
POSSIBLE MALFUNCTION CONDITION (a)

HIGH SEVERITY COLLISION (b)

APPARATUS AND METHOD FOR PROTECTING VEHICLE PASSENGER

CROSS-REFERENCE TO RELATED APPLICATIONS

This application claims priority to and the benefit of Korean Patent Application No. 10-2014-0158940 filed in the Korean Intellectual Property Office on Nov. 14, 2014, the entire contents of which are incorporated herein by reference.

TECHNICAL FIELD

The present specification relates to an apparatus and a method for protecting a vehicle passenger, and more particularly, to an apparatus and a method which sense a collision risk situation of a vehicle using sensors embedded a vehicle, and deploy a passenger protection unit of the vehicle.

BACKGROUND ART

Today's vehicle industry seeks diversity such as a technology of improving performance of a vehicle itself, a vehicle design technology, and a technology regarding devices in the vehicle. In addition, the vehicle involves risks due to the essential nature of the vehicle, and researches and developments are actively conducted in the technical field for safe driving in accordance with overall changes in social attitudes.

A number of technologies for quickly and accurately sensing a vehicle collision and protecting a vehicle passenger are proposed according to this paradigm, and most of the technologies sense a vehicle collision using a plurality of sensors embedded in the vehicle.

The sensors for sensing a vehicle collision include an acceleration sensor, a safing sensor, a front impact sensor (FIS), a side impact sensor (SIS), and the like of an airbag control unit (ACU). That is, according to the related art, there is a problem in that a number of types of sensors such as the aforementioned sensors are required to sense a vehicle collision.

When the number of sensors for sensing a collision of the vehicle is increased as described above, a wire harness in the vehicle becomes complicated. In addition, there is also a problem in that costs required to produce the vehicle are increased as the number of sensors is increased.

SUMMARY OF THE INVENTION

The present invention has been made in an effort to simplify a wire harness in a vehicle by using two-axis sensors for sensing a collision of the vehicle and greatly reducing the number of sensors for sensing a collision of the vehicle.

The present invention has also been made in an effort to reduce costs required to produce a vehicle by using two-axis sensors for sensing a collision of the vehicle and greatly reducing the number of sensors for sensing a collision of the vehicle.

The present invention has also been made in an effort to more accurately sense a collision and operate a passenger protection unit by dividing algorithms into an algorithm for sensing a front collision of a vehicle and an algorithm for sensing a broadside collision of the vehicle.

An exemplary embodiment of the present specification provides an apparatus for protecting a vehicle passenger, including: a front two-axis sensor; a first side two-axis sensor; a second side two-axis sensor; a control unit which determines whether the vehicle passenger is in a front collision situation, by calculating an average value of acceleration values, or determines whether the vehicle passenger is in a broadside collision situation, by calculating a speed and a speed change of the first side two-axis sensor using the acceleration values and by calculating a speed of the second side two-axis sensor; and a protection unit which protects the vehicle passenger based on the determination of the control unit.

The control unit may calculate the average value of the acceleration values in a vehicle traveling direction (X-axis) which are obtained by the first side two-axis sensor and the second side two-axis sensor, and determines whether the vehicle passenger is in the front collision situation, using the average value and the acceleration values in the X-axis direction and a lateral direction (Y-axis) perpendicular to the X-axis direction which are obtained by the front two-axis sensor.

The control unit may calculate displacement, a speed, and a speed change of an airbag control unit (ACU) installed in the vehicle using the average value of the acceleration values obtained, calculates a speed change value of the front two-axis sensor using acceleration values obtained by the front two-axis sensor, and determines whether the vehicle passenger is in the front collision situation, using the displacement, the speed, and the speed change of the ACU, and the speed change value of the front two-axis sensor.

The control unit may calculate displacement, speed, and a speed change of an airbag control unit (ACU) installed in the vehicle using the average value, calculates a first threshold value and a second threshold value using the displacement of the ACU, calculates a difference in moving average values of acceleration and deceleration of the first side two-axis sensor and the second side two-axis sensor, and determines that the vehicle passenger is in the front collision situation when the speed of the ACU is equal to or higher than the first threshold value, the speed change of the ACU is equal to or higher than the second threshold value, and a value of the difference in moving average values of acceleration and deceleration of the first and second side two-axis sensors is lower than a predetermined safing threshold value. The control unit may calculate displacement, speed, and a speed change of an airbag control unit (ACU) installed in the vehicle using the average value, calculates a first of the first threshold value and a second of the first threshold value with respect to the speed of the ACU using the displacement of the ACU, calculates a first of the second threshold value and a second of the second threshold value with respect to the speed change of the ACU using the displacement of the ACU, calculates a threshold value in a vehicle traveling direction (X-axis) and a threshold value in the lateral direction (Y-axis) perpendicular to the X-axis direction with respect to the speed change of the front two-axis sensor using the displacement of the ACU, and determines whether the vehicle passenger is in the front collision situation. The control unit may set the first threshold value and the second threshold value as the first of the first threshold value and the first of the second threshold value, respectively, when an X-axis speed change of the front two-axis sensor is equal to or higher than the X-axis threshold value, and a Y-axis speed change of the front two-axis sensor is equal to or higher than the Y-axis threshold value, sets the first threshold value and the second threshold value as the second of the first threshold value and the second of the second threshold value, respectively, when the X-axis speed change of the front two-axis sensor is lower than the X-axis threshold value, or the Y-axis speed change of the front two-axis sensor is lower than the Y-axis threshold value, and determines whether the vehicle passenger is in the front collision situation.

The control unit may calculate a speed and a speed change of the first side two-axis sensor using a Y-axis acceleration value obtained by the first side two-axis sensor, calculates speed of the second side two-axis sensor using a Y-axis acceleration value obtained by the second side two-axis sensor, and determines whether the vehicle passenger is in the broadside collision situation, using the speed and the speed change of the first side two-axis sensor and the speed of the second side two-axis sensor.

The control unit may calculate a speed and a speed change of the first side two-axis sensor using a Y-axis acceleration value obtained by the first side two-axis sensor, calculates speed of the second side two-axis sensor using the Y-axis acceleration value obtained by the second side two-axis sensor, calculates a plural threshold values using the speed of the second side two-axis sensor, and determines that the vehicle passenger is in the broadside collision situation when the speed and the speed change of the first side two-axis sensor are equal to or higher than the threshold values, and average deceleration of the front two-axis sensor or average deceleration of the second side two-axis sensor are higher than predetermined safing threshold value.

Another exemplary embodiment of the present specification provides a method of protecting a vehicle passenger, including: an obtaining step of obtaining acceleration values using a front two-axis sensor, a first side two-axis sensor, and a second side two-axis sensor;
a calculating step of calculating an average value of acceleration values obtained in the obtaining step, or calculating speed and a speed change of the first side two-axis sensor and speed of the second side two-axis sensor using the acceleration value obtained in the obtaining step; a collision determining step of determining whether the vehicle passenger is in a front collision situation, using the average value obtained in the calculating step and acceleration values of the front two-axis sensor obtained in the obtaining step, or determining whether the vehicle passenger is in a broadside collision situation, using the speed and the speed change of the first side two-axis sensor and the speed of the second side two-axis sensor which are obtained in the calculating step; and a protecting step of protecting the vehicle passenger based on the determination of the collision determining step.

The calculating step may calculate the average value of the acceleration values in a vehicle traveling direction (X-axis) which are obtained by the first side two-axis sensor and the second side two-axis sensor, and the collision determining step determines whether the vehicle passenger is in the front collision situation, using the average value and the acceleration values in the X-axis direction and a lateral direction (Y-axis) perpendicular to the X-axis direction which are obtained by the front two-axis sensor.

The collision determining step may calculate displacement, speed, and a speed change of an airbag control unit (ACU) installed in the vehicle using the average value, calculates a speed change value of the front two-axis sensor using acceleration values obtained by the front two-axis sensor, and determines whether the vehicle passenger is in the front collision situation, using the displacement, the speed, and the speed change of the ACU, and the speed change value of the front two-axis sensor.

The collision determining step may calculate displacement, speed, and a speed change of an airbag control unit (ACU) installed in the vehicle using the average value, calculates a first threshold value and a second threshold value using the displacement of the ACU, calculates a difference in moving average values of acceleration and deceleration of the first side two-axis sensor and the second side two-axis sensor, and determines that the vehicle passenger is in the front collision situation when the speed of the ACU is equal to or higher than the first threshold value, the speed change of the ACU is equal to or higher than the second threshold value, and a value of the difference in moving average values of acceleration and deceleration of the first side two-axis sensor and the second side two-axis sensor is lower than a predetermined safing threshold value.

The collision determining step may calculate displacement, speed, and a speed change of an airbag control unit (ACU) installed in the vehicle using the average value, calculates a first of the first threshold value and a second of the first threshold value with respect to the speed of the ACU using the displacement of the ACU, calculates a first of the second threshold value and a second of the second threshold value with respect to the speed change of the ACU using the displacement of the ACU, calculates a threshold value in a vehicle traveling direction (X-axis) and a threshold value in the lateral direction (Y-axis) perpendicular to the X-axis direction with respect to the speed change of the front two-axis sensor using the displacement of the ACU, and determines whether the vehicle passenger is in the front collision situation.

The collision determining step may set the first threshold value and the second threshold value as the first of the first threshold value and the first of the second threshold value, respectively, when an X-axis speed change of the front two-axis sensor is equal to or higher than the X-axis threshold value, and a Y-axis speed change of the front two-axis sensor is equal to or higher than the Y-axis threshold value, sets the first threshold value and the second threshold value as the second of the first threshold value and the second of the second threshold value, respectively, when the X-axis speed change of the front two-axis sensor is lower than the X-axis threshold value, or the Y-axis speed change of the front two-axis sensor is lower than the Y-axis threshold value, and determines whether the vehicle passenger is in the front collision situation.

The collision determining step may calculate a speed and a speed change of the first side two-axis sensor using a Y-axis acceleration value obtained by the first side two-axis sensor, calculates speed of the second side two-axis sensor using a Y-axis acceleration value obtained by the second side two-axis sensor, and determines whether the vehicle passenger is in the broadside collision situation, using the speed and the speed change of the first side two-axis sensor and the speed of the second side two-axis sensor.

The collision determining step may calculate a speed and a speed change of the first side two-axis sensor using a Y-axis acceleration value obtained by the first side two-axis sensor, calculates speed of the second side two-axis sensor using the Y-axis acceleration value obtained by the second side two-axis sensor, calculates a plural threshold values using the speed of the second side two-axis sensor, and determines that the vehicle passenger is in the broadside collision situation when the speed and the speed change of the first side two-axis sensor are equal to or higher than the threshold values, and average deceleration of the front two-axis sensor or average deceleration of the second side two-axis sensor are higher than predetermined safing threshold value.

The exemplary embodiment of the present specification uses two-axis sensors for sensing a collision of a vehicle, thereby greatly reducing the number of sensors for sensing a collision of the vehicle, and simplifying a wire harness in the vehicle.

The exemplary embodiment of the present specification uses two-axis sensors for sensing a collision of a vehicle, thereby greatly reducing the number of sensors for sensing a collision of the vehicle, and reducing costs required to produce the vehicle.

The exemplary embodiment of the present specification divides algorithms into an algorithm for sensing a front collision of a vehicle and an algorithm for sensing a broadside collision of the vehicle, thereby more accurately sensing a collision and operating a passenger protection unit.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
FIG. 1 is a block diagram of an apparatus for protecting a vehicle passenger according to an exemplary embodiment of the present specification.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present specification will be described in detail with reference to the accompanying drawings.

In the description of the exemplary embodiments, technical contents, which are well known in the technical field to which the present specification pertains and are not directly relevant to the present specification, will be omitted. The reason is to provide the subject matter of the present specification more clearly by omitting unnecessary descriptions without obscuring the subject matter of the present specification.

For the same reason, some constituent elements are exaggerated, omitted, or schematically illustrated in the accompanying drawings. In addition, a size of each of the constituent elements is not entirely reflective of an actual size. Like reference numerals refer to the same or corresponding constituent elements in the respective drawings.

Hereinafter, an apparatus for protecting a vehicle passenger according to a first exemplary embodiment of the present specification will be described with reference to FIGS. 1 to 4.

FIG. 1 is a block diagram of an apparatus for protecting a vehicle passenger according to an exemplary embodiment of the present specification. FIG. 1 explains an apparatus for protecting a vehicle passenger in a situation of a head-on collision of a vehicle.

Referring to FIG. 1, an apparatus 100 for protecting a vehicle passenger according to the first exemplary embodiment of the present specification includes a sensor unit 10, a control unit 20, and a protection unit 30.

The sensor unit 10 includes a front two-axis sensor, a first side two-axis sensor, and a second side two-axis sensor.

If the first side two-axis sensor is a left two-axis sensor, the second side two-axis sensor means a right two-axis sensor. Meanwhile, if the first side two-axis sensor is the right two-axis sensor, the second side two-axis sensor means the left two-axis sensor.

Figure 2:
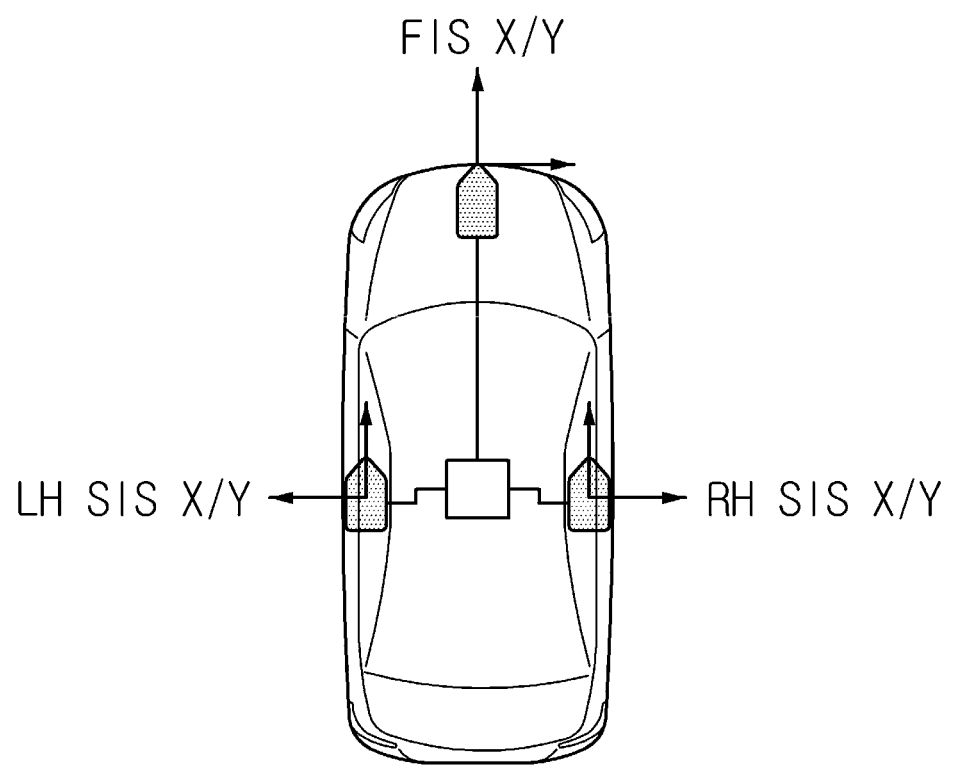
FIG. 2 is an explanatory view illustrating two-axis sensors, for sensing a collision of a vehicle, of the apparatus for protecting a vehicle passenger according to the exemplary embodiment of the present specification.

FIG. 2 is an explanatory view illustrating the two-axis sensors, for sensing a collision of the vehicle, of the apparatus for protecting a vehicle passenger according to the exemplary embodiment of the present specification.

Referring to FIG. 2, the sensor unit 10 may include a front impact two-axis sensor FIS X/Y, a left side impact two-axis sensor LH SIS X/Y, and a right side impact two-axis sensor RH SIS X/Y.

In this case, the X-axis means a traveling direction of the vehicle, and the Y-axis means a lateral direction perpendicular to the traveling direction of the vehicle.

The sensor unit 10 obtains a collision acceleration value at the time of a head-on collision of the vehicle.

The control unit 20 calculates an average value of X-axis acceleration values obtained by the first side two-axis sensor and the second side two-axis sensor, and determines whether the vehicle passenger is in a front collision situation, using the average value and X-axis and Y-axis acceleration values obtained by the front two-axis sensor.

The average value means a value that is the same as a collision acceleration value of an airbag control unit (ACU) installed in the vehicle. That is, the average value of the values obtained by the first side sensor and the second side sensor may be substituted for a value obtained by a sensor of the ACU in the related art.

Figure 3:
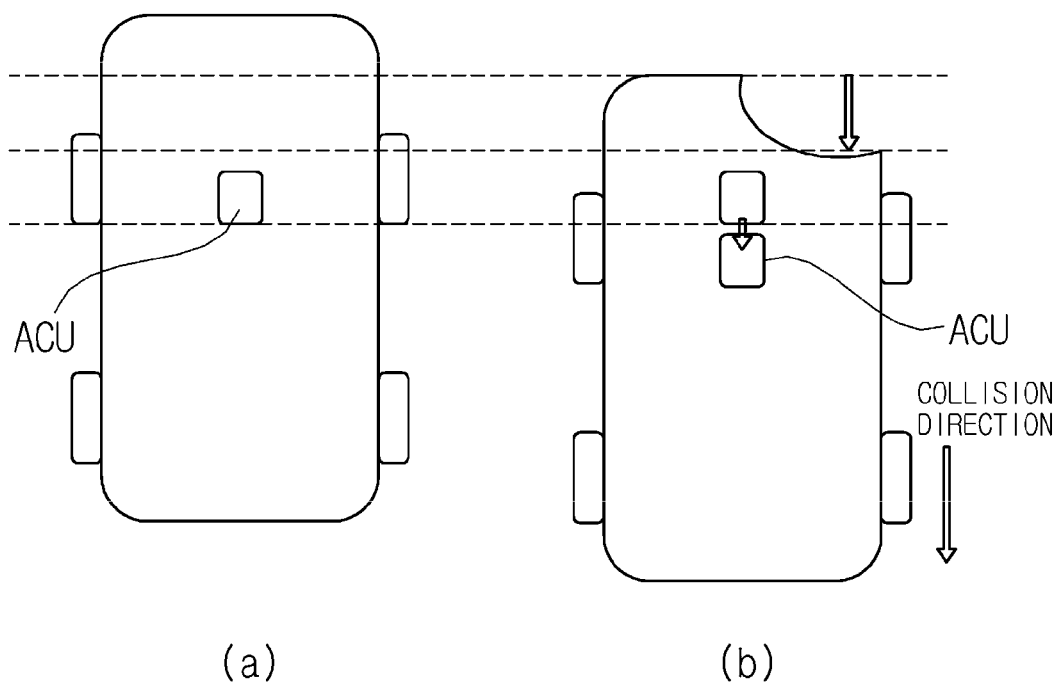
FIG. 3 is an explanatory view illustrating a situation of a head-on collision for operating a passenger protection unit of the apparatus for protecting a vehicle passenger according to the exemplary embodiment of the present specification.

FIG. 3 is an explanatory view illustrating a situation of a head-on collision for operating the passenger protection unit of the apparatus for protecting a vehicle passenger according to the exemplary embodiment of the present specification.

The front collision situation means a situation in which the apparatus for protecting a front passenger needs to be operated in a situation of a head-on collision. Referring to FIG. 3A, when severity of a collision is low even though a head-on collision occurs when the vehicle travels, for example, when the vehicle travels on a rough road or passes over an obstacle, the control unit 20 determines that this situation is not the front collision situation. In contrast, referring to FIG. 3B, when severity of a collision is high, the control unit 20 determines that this situation is the front collision situation.

In the case of the high severity collision, behavior of a passenger in the vehicle is greatly changed, and a front portion of the vehicle is also greatly deformed. That is, when severity of a collision is low, that is, when the vehicle travels on a rough road or passes over an obstacle, behavior of a passenger in the vehicle may also be greatly changed, but the front portion of the vehicle may be less or hardly deformed. Therefore, the deformation of the front portion of the vehicle is also considered at the time of determining the front collision situation, thereby improving accuracy when operating the apparatus for protecting a passenger.

The control unit 20 calculates displacement, speed, and a speed change of the ACU installed in the vehicle using the average value. In addition, the control unit calculates a speed change value of the front two-axis sensor using the acceleration value obtained by the front two-axis sensor. The control unit 20 may determine whether the vehicle passenger is in the front collision situation, using the displacement, the speed, and the speed change of the ACU, and using the speed change value of the front two-axis sensor.

The displacement of the ACU may be calculated by double-integrating the average value with respect to a predetermined time. In addition, the speed of the ACU may be calculated by integrating the average value once with respect to a predetermined time. In addition, the speed change of the ACU may be calculated by signal-processing the average value. In addition, the speed change of the front two-axis sensor may be calculated by signal-processing the acceleration value obtained by the front two-axis sensor.

The control unit 20 calculates a first critical value and a second critical value using the displacement of the ACU. In addition, a difference in moving average values of acceleration and deceleration of the first side two-axis sensor and the second side two-axis sensor is calculated using the displacement of the ACU. Accordingly, when the speed of the ACU is equal to or higher than the first critical value, the speed change of the ACU is equal to or higher than the second critical value, and a value of the difference in moving average values of acceleration and deceleration of the first side two-axis sensor and the second side two-axis sensor is lower than a predetermined safing critical value, the control unit 20 may determine that the vehicle passenger is in the front collision situation.

Here, the first critical value means a critical value associated with the speed of the ACU, and the second critical value means a critical value associated with the speed change of the ACU. In addition, the safing critical value means a critical value that has been obtained by a safing sensor mounted in the vehicle in the related art.

The control unit 20 calculates a first of the first critical value and a second of the first critical value with respect to the speed of the ACU using the displacement of the ACU. In addition, the control unit 20 calculates a first of the second critical value and a second of the second critical value with respect to the speed change of the ACU using the displacement of the ACU. In addition, the control unit 20 calculates an X-axis critical value and a Y-axis critical value with respect to the speed change of the front two-axis sensor using the displacement of the ACU.

The first of the first critical value, the second of the first critical value, the first of the second critical value, the second of the second critical value, the X-axis critical value, and the Y-axis critical value may be calculated using a lookup table that is stored in the control unit 20 in advance.

Accordingly, when the X-axis speed change of the front two-axis sensor is equal to or higher than the X-axis critical value, and the Y-axis speed change of the front two-axis sensor is equal to or higher than the Y-axis critical value, the control unit 20 sets the first critical value and the second critical value as the first of the first critical value and the first of the second critical value, respectively.

In contrast, when the X-axis speed change of the front two-axis sensor is lower than the X-axis critical value, and the Y-axis speed change of the front two-axis sensor is lower than the Y-axis critical value, the control unit 20 sets the first critical value and the second critical value as the second of the first critical value and the second of the second critical value, respectively.

Accordingly, when the speed of the ACU is equal to or higher than the first critical value, the speed change of the ACU is equal to or higher than the second critical value, and the value of the difference in moving average values of acceleration and deceleration of the first and second side two-axis sensors is lower than a predetermined safing critical value, the control unit 20 may determine that the vehicle passenger is in the front collision situation.

When the vehicle passenger is in the front collision situation as a determination result of the control unit 20, the protection unit 30 restricts the passenger.

The protection unit 30 includes all of the passenger protection means such as an airbag, and a seat belt pre-tensioner that may be provided in the vehicle.

Figure 4:
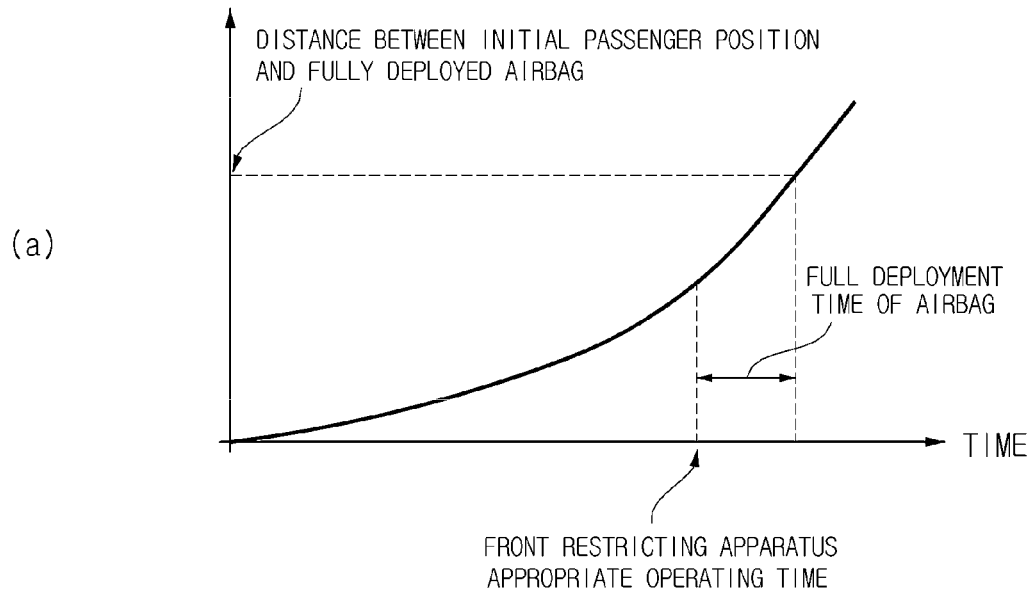
FIG. 4 is an explanatory view illustrating a condition for deploying an airbag of the apparatus for protecting a vehicle passenger according to the exemplary embodiment of the present specification at the time of a head-on collision.
Figure 4:
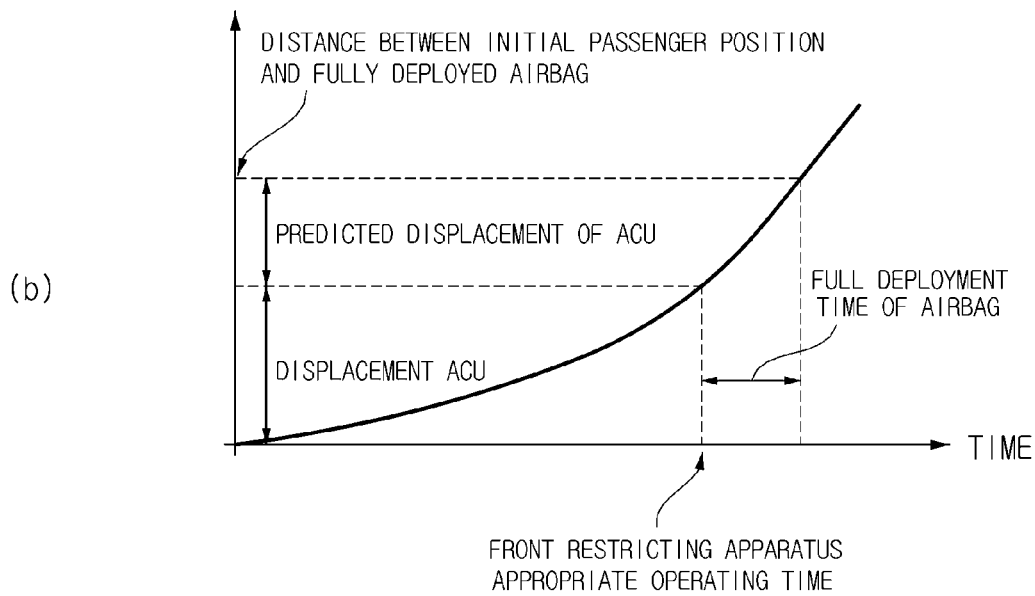

FIG. 4 is an explanatory view illustrating a condition for deploying the airbag of the apparatus for protecting a vehicle passenger according to the exemplary embodiment of the present specification at the time of a head-on collision.

Referring to FIG. 4A, the apparatus for protecting a front passenger needs to be appropriately operated in accordance with behavior of the passenger at the time of a head-on collision, and an appropriate operating time may be calculated based on the behavior of the passenger and a full deployment time of the airbag. The apparatus for protecting a front passenger needs to be operated within time defined by subtracting the full deployment time of the airbag from the time for which the passenger moves a distance between an initial passenger position and the fully deployed airbag. Only by the aforementioned operation, the passenger may be appropriately protected by the fully deployed airbag.

Referring to FIG. 4B, the behavior of the passenger may be calculated using the displacement of the ACU that is obtained by double-integrating acceleration and deceleration obtained from a position of the ACU. However, when an actual collision occurs and an algorithm is operated, only the current acceleration and deceleration are obtained. In addition, the apparatus for protecting a front passenger needs to be operated within the time defined by subtracting the full deployment time of the airbag from the time for which the passenger moves a distance between an initial passenger position and the fully deployed airbag. Therefore, it is necessary to predict how much an amount of behavior of the passenger occurs for the time for which the airbag is fully deployed. That is, the apparatus for protecting a front passenger needs to be operated at a point of time at which the sum of the displacement of the ACU and predicted displacement of the ACU becomes a distance between the initial passenger position and the fully deployed airbag. The predicted displacement may be calculated by processing the speed, which is obtained by integrating the acceleration and deceleration obtained from the ACU once, with a function.

Hereinafter, an apparatus for protecting a vehicle passenger according to a second exemplary embodiment of the present specification will be described with reference to FIGS. 1, 2 and 6.

FIG. 1 is a block diagram of the apparatus for protecting a vehicle passenger according to the exemplary embodiment of the present specification. FIG. 1 explains the apparatus for protecting a vehicle passenger in a situation of a broadside collision of the vehicle.

Referring to FIG. 1, an apparatus 100 for protecting a vehicle passenger according to the second exemplary embodiment of the present specification includes a sensor unit 10, a control unit 20, and a protection unit 30.

The sensor unit 10 includes a front two-axis sensor, a first side two-axis sensor, and a second side two-axis sensor.

If the first side two-axis sensor is a left two-axis sensor, the second side two-axis sensor means a right two-axis sensor. Meanwhile, if the first side two-axis sensor is the right two-axis sensor, the second side two-axis sensor means the left two-axis sensor.

FIG. 2 is an explanatory view illustrating the two-axis sensors, for sensing a collision of the vehicle, of the apparatus for protecting a vehicle passenger according to the exemplary embodiment of the present specification.

Referring to FIG. 2, the sensor unit 10 may include a front impact two-axis sensor FIS X/Y, a left side impact two-axis sensor LH SIS X/Y, and a right side impact two-axis sensor RH SIS X/Y.

In this case, the X-axis means a traveling direction of the vehicle, and the Y-axis means a lateral direction perpendicular to the traveling direction of the vehicle.

The sensor unit 10 obtains a collision acceleration value at the time of a broadside collision of the vehicle.

The control unit 20 calculates speed and a speed change of the first side two-axis sensor using a Y-axis acceleration value obtained by the first side two-axis sensor. In addition, the control unit 20 calculates speed of the second side two-axis sensor using a Y-axis acceleration value obtained by the second side two-axis sensor. The control unit 20 may determine that the vehicle passenger is in a broadside collision situation, using the speed and the speed change of the first side two-axis sensor and the speed of the second side two-axis sensor.

The speed of the first side two-axis sensor and the speed of the second side two-axis sensor may be calculated by integrating the Y-axis acceleration values obtained by the first side two-axis sensor and the second side two-axis sensor once with respect to a predetermined time, respectively. In addition, the speed change of the first side two-axis sensor and the speed change of the second side two-axis sensor may be calculated by signal-processing the Y-axis acceleration values obtained by the first side two-axis sensor and the second side two-axis sensor, respectively.

The control unit 20 may calculate a plurality of critical values using the speed of the second side two-axis sensor, and may determine that the vehicle passenger is in the broadside collision situation, when the speed and the speed change of the first side two-axis sensor are equal to or higher than the critical values, and average acceleration and deceleration of the front two-axis sensor or average acceleration and deceleration of the second side two-axis sensor are higher than a predetermined safing critical values.

Figure 6:
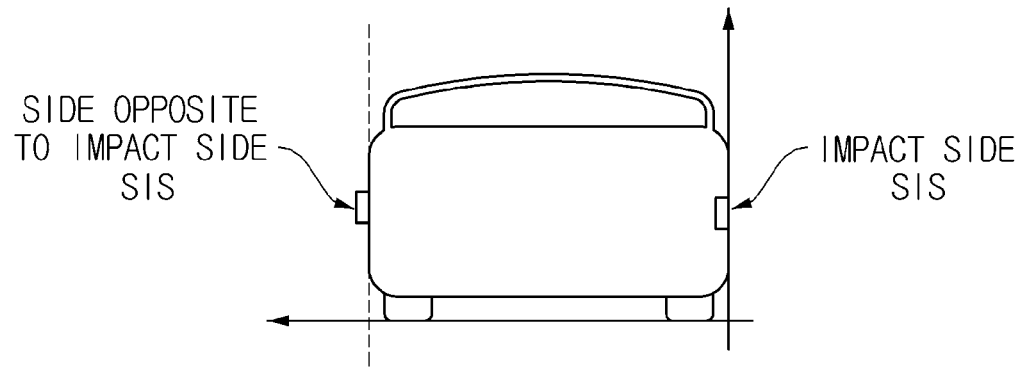
FIG. 6 is an explanatory view illustrating a situation of a broadside collision for operating the passenger protection unit of the apparatus for protecting a vehicle passenger according to the exemplary embodiment of the present specification.
Figure 6:
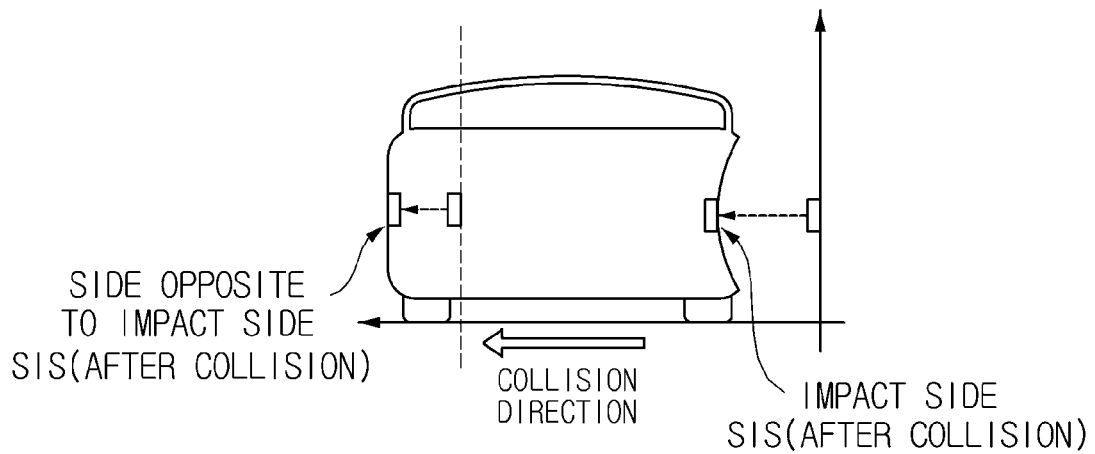

FIG. 6 is an explanatory view illustrating a situation of a broadside collision for operating the passenger protection unit of the apparatus for protecting a vehicle passenger according to the exemplary embodiment of the present specification.

The broadside collision situation means a situation in which the apparatus for protecting a lateral passenger needs to be operated in a situation of a broadside collision. Referring to FIG. 6A, when severity of a collision is low even though a broadside collision occurs when the vehicle travels, for example, when the vehicle travels on a rough road or passes over an obstacle, or when a door of the vehicle is slammed, the control unit 20 determines that this situation is not the broadside collision situation. In contrast, referring to FIG. 6B, when severity of a collision is high, the control unit 20 determines that this situation is the broadside collision situation.

In the case of a high severity collision, high acceleration occurs at an impact side two-axis sensor, and positions of the impact side two-axis sensor and the opposite side two-axis sensor opposite to the impact side two-axis sensor are also greatly deformed or pushed. That is, when severity of a collision is low, that is, when the vehicle travels on a rough road or passes over an obstacle, or when the door of the vehicle is slammed, high acceleration may also occur at the impact side two-axis sensor, but the positions of the impact side two-axis sensor and the opposite side two-axis sensor are not deformed or pushed. Therefore, the phenomenon in which the positions of the impact side two-axis sensor and the opposite side two-axis sensor are deformed or pushed is also considered at the time of determining the broadside collision situation, thereby improving accuracy when operating the apparatus for protecting a passenger.

The plurality critical values means a first critical value associated with the speed change of the first side two-axis sensor, and a second critical value associated with the speed of the first side two-axis sensor. The first critical value and the second critical value may be calculated using a lookup table that is stored in the control unit 20 in advance.

The safing critical value means a critical value that has been obtained by a safing sensor mounted in the vehicle in the related art.

When the vehicle passenger is in the broadside collision situation as a determination result of the control unit 20, the protection unit 30 restricts the passenger.

The protection unit 30 includes all of the passenger protection means such as an airbag, and a seat belt pre-tensioner that may be provided in the vehicle.

Hereinafter, a method of protecting a vehicle passenger according to the first exemplary embodiment of the present specification will be described with reference to FIG. 5.

Figure 5:
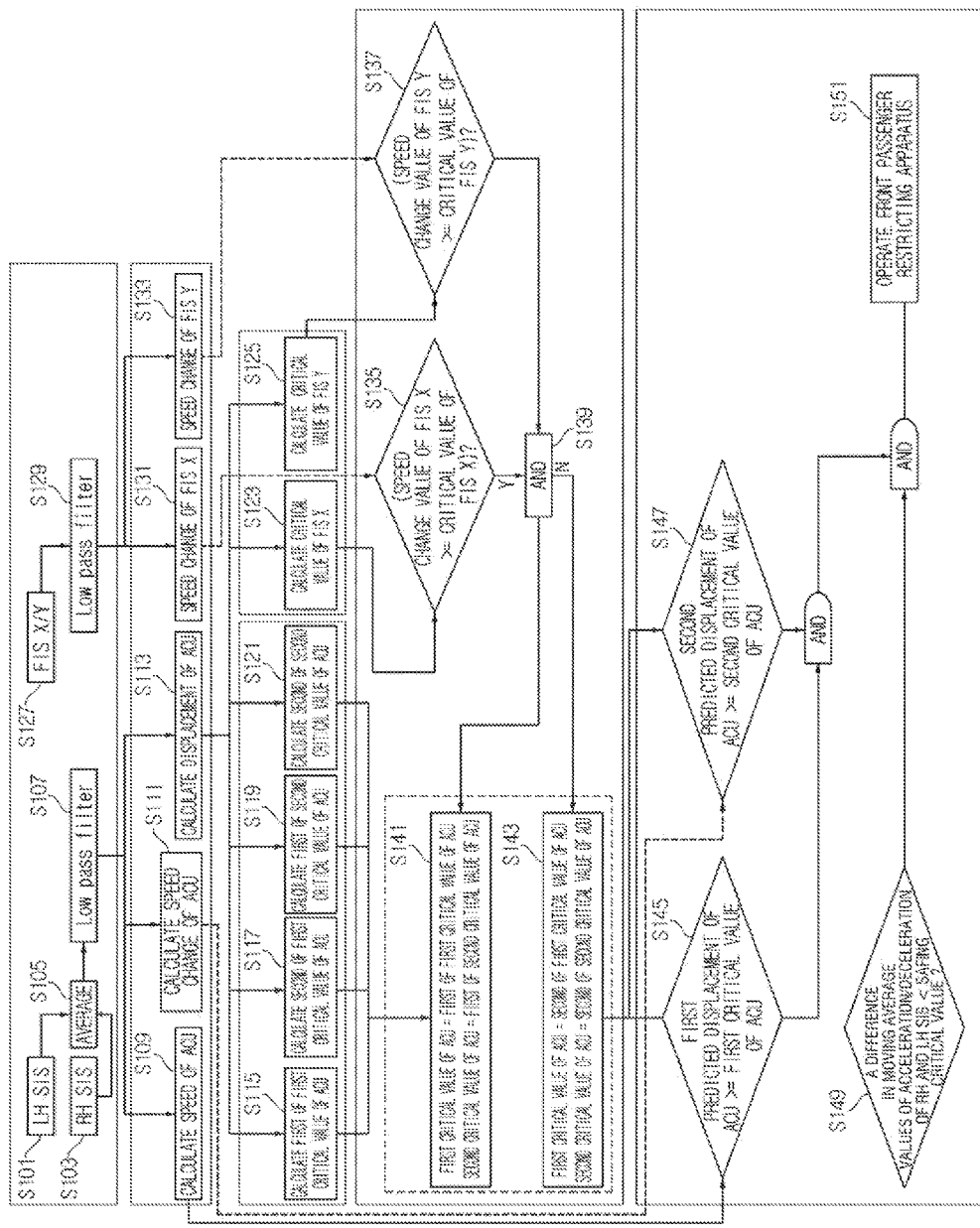
FIG. 5 is a flowchart illustrating a process of operating the front passenger protection unit of the apparatus for protecting a vehicle passenger according to a first exemplary embodiment of the present specification at the time of a head-on collision.

FIG. 5 is a flowchart illustrating a process of operating the front passenger protection unit of the apparatus for protecting a vehicle passenger according to the first exemplary embodiment of the present specification at the time of a head-on collision.

First, the acceleration values, which are generated at the time of a head-on collision, are obtained by the first side two-axis sensor and the second side two-axis sensor of the sensor unit 10 (S101, and S103).

Thereafter, the control unit 20 calculates the average value of the X-axis acceleration values obtained by the first side two-axis sensor and the second side two-axis sensor (S105).

The average value means a value that is the same as a collision acceleration value of the ACU installed in the vehicle. That is, the average value of the values obtained by the first side sensor and the second side sensor may be substituted for a value obtained by a sensor of the ACU in the related art.

Thereafter, the control unit 20 filters the average value using a low pass filter (S107). This process is to remove noise signals existing in the average value.

Thereafter, the control unit 20 calculates the speed, the speed change, and the displacement of the ACU using the average value (S109, S111, and S113).

The displacement of the ACU may be calculated by double-integrating the average value with respect to a predetermined time. In addition, the speed of the ACU may be calculated by integrating the average value once with respect to a predetermined time. In addition, the speed change of the ACU may be calculated by signal-processing the average value.

Thereafter, the control unit 20 calculates the first of the first critical value and the second of the first critical value with respect to the speed of the ACU using the displacement of the ACU (S115 and S117). In addition, the control unit 20 calculates the first of the second critical value and the second of the second critical value with respect to the speed change of the ACU using the displacement of the ACU (S119 and S121). In addition, the control unit 20 calculates the X-axis critical value and the Y-axis critical value with respect to the speed change of the front two-axis sensor using the displacement of the ACU (S123 and S125).

The first of the first critical value, the second of the first critical value, the first of the second critical value, the second of the second critical value, the X-axis critical value, and the Y-axis critical value may be calculated using a lookup table that is stored in the control unit 20 in advance.

The acceleration value, which is generated at the time of a broadside collision, is obtained by the front two-axis sensor of the sensor unit 10 (S127).

Thereafter, the control unit 20 filters the acceleration value using the low pass filter (S129). This process is to remove noise signals existing in the acceleration value.

Thereafter, the control unit 20 calculates the X-axis speed change value of the front two-axis sensor and the Y-axis speed change value of the front two-axis sensor using the acceleration value (S131 and S133).

The speed change of the front two-axis sensor may be calculated by signal-processing the acceleration value obtained by the front two-axis sensor.

Thereafter, the control unit 20 compares the X-axis speed change of the front two-axis sensor with the X-axis critical value, and compares the Y-axis speed change of the front two-axis sensor with the Y-axis critical value (S135 and S137).

Thereafter, the control unit 20 determines whether X-axis speed change of the front two-axis sensor is equal to or higher than the X-axis critical value, and the Y-axis speed change of the front two-axis sensor is equal to or higher than the Y-axis critical value (S139).

As a determination result of the control unit 20 through step S139, when the X-axis speed change of the front two-axis sensor is equal to or higher than the X-axis critical value, and the Y-axis speed change of the front two-axis sensor is equal to or higher than the Y-axis critical value, the control unit 20 sets the first critical value and the second critical value as the first of the first critical value and the first of the second critical value, respectively (S141).

In contrast, as a determination result of the control unit 20 through step S139, when the X-axis speed change of the front two-axis sensor is lower than the X-axis critical value, or the Y-axis speed change of the front two-axis sensor is lower than the Y-axis critical value, the control unit 20 sets the first critical value and the second critical value as the second of the first critical value and the second of the second critical value, respectively (S143).

Here, the first critical value means a critical value associated with the speed of the ACU, and the second critical value means a critical value associated with the speed change of the ACU.

Thereafter, the control unit 20 compares the speed of the ACU with the first critical value, and compares the speed change of the ACU with the second critical value (S145 and S147).

The difference in moving average values of acceleration and deceleration of the first side two-axis sensor and the second side two-axis sensor is calculated using the displacement of the ACU (S149).

Thereafter, when the speed of the ACU is equal to or higher than the first critical value, the speed change of the ACU is equal to or higher than the second critical value, and the value of the difference in moving average values of acceleration and deceleration of the first and second side two-axis sensors is lower than a predetermined safing critical value, the control unit 20 determines that the vehicle passenger is in the front collision situation, and operates the protection unit 30 (S151).

The safing critical value means a critical value that has been obtained by a safing sensor mounted in the vehicle in the related art.

Hereinafter, a method of protecting a vehicle passenger according to the second exemplary embodiment of the present specification will be described with reference to FIG. 7.

Figure 7:
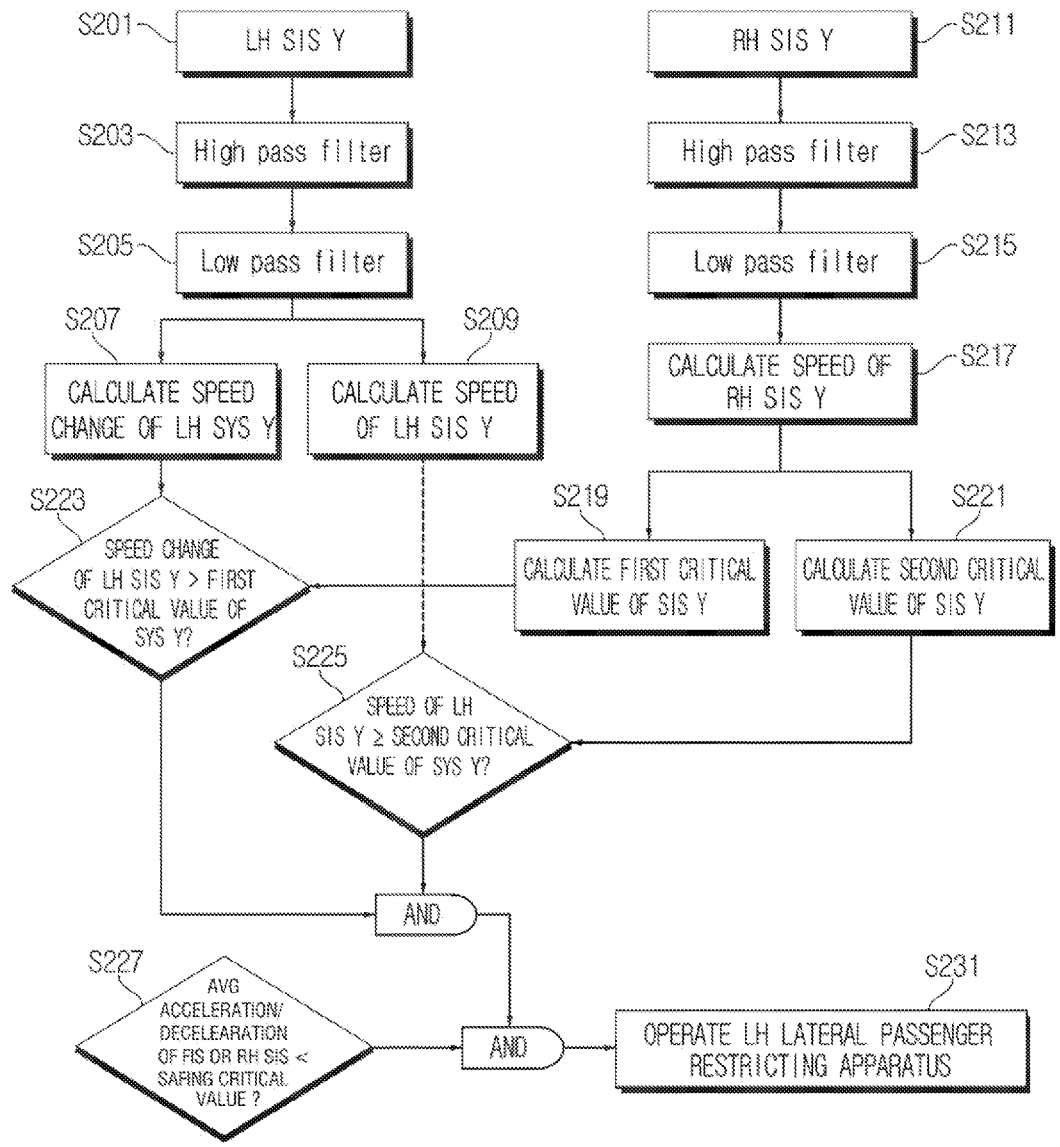
FIG. 7 is a flowchart illustrating a process of operating a left passenger protection unit of the apparatus for protecting a vehicle passenger according to a second exemplary embodiment of the present specification at the time of a left broadside collision.

FIG. 7 is a flowchart illustrating a process of operating a left passenger protection unit of the apparatus for protecting a vehicle passenger according to the second exemplary embodiment of the present specification at the time of a left broadside collision.

In this case, it is based upon the premise that the first side two-axis sensor is a left two-axis sensor. In addition, it is based upon the premise that the second side two-axis sensor is a right two-axis sensor.

First, the Y-axis acceleration value, which is generated at the time of a left broadside collision, is obtained by the first side two-axis sensor of the sensor unit 10 (S201).

Thereafter, the control unit 20 filters the acceleration value using a high pass filter (S203). This process is to correct an offset of the acceleration value.

Thereafter, the control unit 20 filters the acceleration value using a low pass filter (S205). This process is to remove noise signals existing in the acceleration value.

Thereafter, the control unit 20 calculates the speed change and the speed of the first side two-axis sensor using the acceleration value (S207 and S209).

The speed of the first side two-axis sensor may be calculated by integrating the acceleration value once with respect to a predetermined time. In addition, the speed change of the first side two-axis sensor may be calculated by signal-processing the acceleration value.

The acceleration value, which is generated at the time of a left broadside collision, is obtained by the second side two-axis sensor of the sensor unit 10 (S211).

Thereafter, the control unit 20 filters the acceleration value using the high pass filter (S213). This process is to correct an offset of the acceleration value.

Thereafter, the control unit 20 filters the acceleration value using the low pass filter (S215). This process is to remove noise signals existing in the acceleration value.

Thereafter, the control unit 20 calculates the speed of the second side two-axis sensor using the acceleration value (S217).

The speed of the second side two-axis sensor may be calculated by integrating the acceleration value once with respect to a predetermined time.

Thereafter, the control unit 20 calculates the first critical value and the second critical value using the speed of the second side two-axis sensor (S219 and S221).

The first critical value and the second critical value mean a first critical value associated with the speed change of the first side two-axis sensor, and a second critical value associated with the speed of the first side two-axis sensor. The first critical value and the second critical value may be calculated using a lookup table that is stored in the control unit 20 in advance.

Thereafter, the control unit 20 compares the speed change of the first side two-axis sensor with the first critical value, and compares the speed of the first side two-axis sensor with the second critical value (S223 and S225).

The control unit 20 compares the average acceleration and deceleration of the front two-axis sensor or the average acceleration and deceleration of the second side two-axis sensor with a predetermined safing critical value (S227).

The safing critical value means a critical value that has been obtained by a safing sensor mounted in the vehicle in the related art.

Thereafter, when the speed change of the first side two-axis sensor is equal to or higher than the first critical value, the speed change of the first side two-axis sensor is equal to or higher than the second critical value, and the average acceleration and deceleration of the front two-axis sensor or the average acceleration and deceleration of the second side two-axis sensor are lower than the predetermined safing critical values, the control unit 20 determines that the vehicle passenger is in a left collision situation, and operates the protection unit 30 (S231).

Hereinafter, a method of protecting a vehicle passenger according to a third exemplary embodiment of the present specification will be described with reference to FIG. 8.

Figure 8:
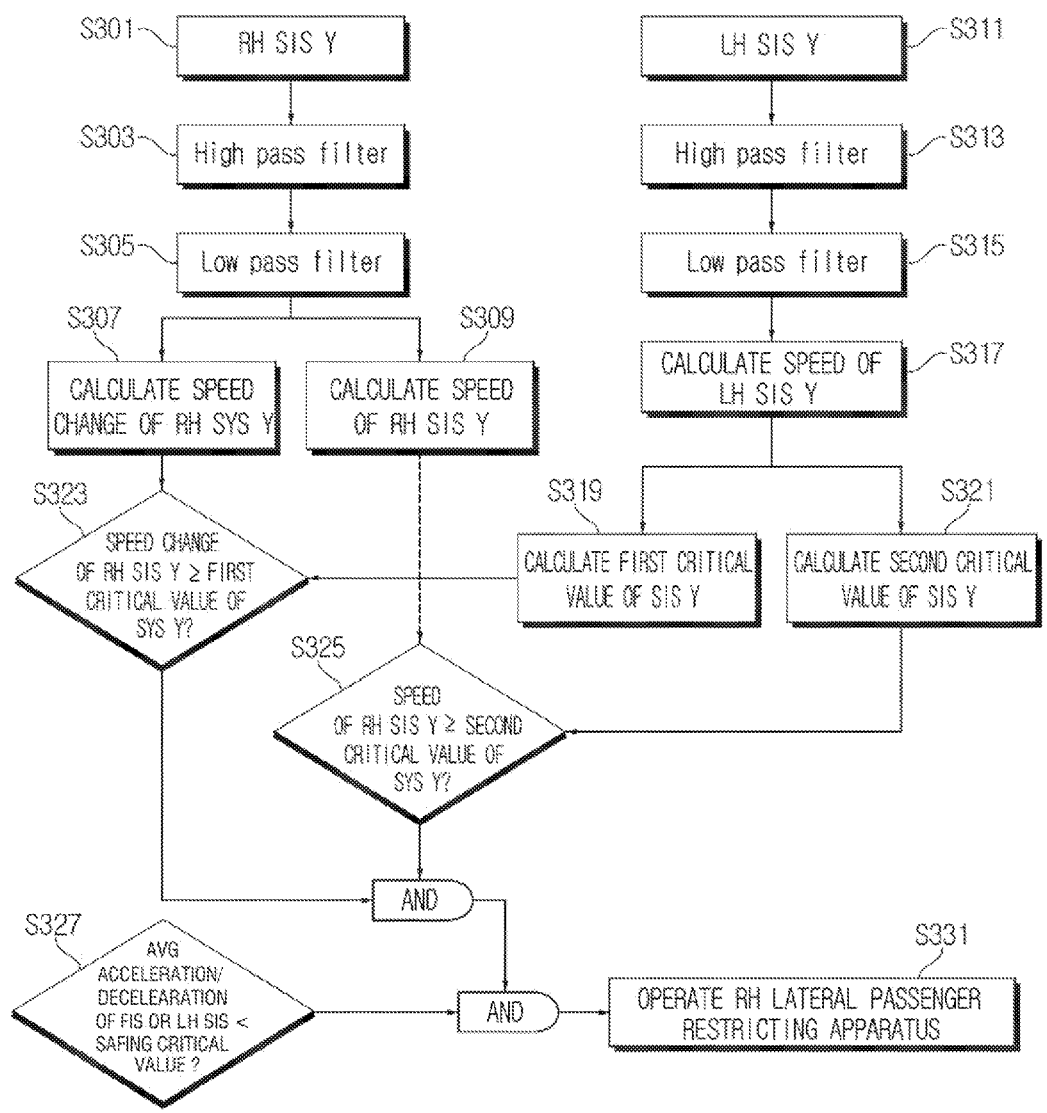
FIG. 8 is a flowchart illustrating a process of operating a right passenger protection unit of the apparatus for protecting a vehicle passenger according to a third exemplary embodiment of the present specification at the time of a right broadside collision.

FIG. 8 is a flowchart illustrating a process of operating an apparatus for restricting a right passenger of the apparatus for protecting a vehicle passenger according to the third exemplary embodiment of the present specification at the time of a right broadside collision.

In this case, it is based upon the premise that the first side two-axis sensor is a right two-axis sensor. In addition, it is based upon the premise that the second side two-axis sensor is a left two-axis sensor.

First, the Y-axis acceleration value, which is generated at the time of a right broadside collision, is obtained by the first side two-axis sensor of the sensor unit 10 (S301).

Thereafter, the control unit 20 filters the acceleration value using the high pass filter (S303). This process is to correct an offset of the acceleration value.

Thereafter, the control unit 20 filters the acceleration value using the low pass filter (S305). This process is to remove noise signals existing in the acceleration value.

Thereafter, the control unit 20 calculates the speed change and the speed of the first side two-axis sensor using the acceleration value (S307 and S309).

The speed of the first side two-axis sensor may be calculated by integrating the acceleration value once with respect to a predetermined time. In addition, the speed change of the first side two-axis sensor may be calculated by signal-processing the acceleration value.

The acceleration value, which is generated at the time of a right broadside collision, is obtained by the second side two-axis sensor of the sensor unit 10 (S311).

Thereafter, the control unit 20 filters the acceleration value using the high pass filter (S313). This process is to correct an offset of the acceleration value.

Thereafter, the control unit 20 filters the acceleration value using the low pass filter (S315). This process is to remove noise signals existing in the acceleration value.

Thereafter, the control unit 20 calculates the speed of the second side two-axis sensor using the acceleration value (S317).

The speed of the second side two-axis sensor may be calculated by integrating the acceleration value once with respect to a predetermined time.

Thereafter, the control unit 20 calculates the first critical value and the second critical value using the speed of the second side two-axis sensor (S319 and S321).

The first critical value and the second critical value mean a first critical value associated with the speed change of the first side two-axis sensor, and a second critical value associated with the speed of the first side two-axis sensor. The first critical value and the second critical value may be calculated using a lookup table that is stored in the control unit 20 in advance.

Thereafter, the control unit 20 compares the speed change of the first side two-axis sensor with the first critical value, and compares the speed of the first side two-axis sensor with the second critical value (S323 and S325).

The control unit 20 compares the average acceleration and deceleration of the front two-axis sensor or the average acceleration and deceleration of the second side two-axis sensor with a predetermined safing critical value (S327).

The safing critical value means a critical value that has been obtained by a safing sensor mounted in the vehicle in the related art.

Thereafter, when the speed change of the first side two-axis sensor is equal to or higher than the first critical value, the speed change of the first side two-axis sensor is equal to or higher than the second critical value, and the average acceleration and deceleration of the front two-axis sensor or the average acceleration and deceleration of the second side two-axis sensor are lower than the predetermined safing critical values, the control unit 20 determines that the vehicle passenger is in a right collision situation, and operates the protection unit 30 (S331).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for protecting a person in a vehicle, the apparatus comprising:
   a front two-axis sensor;
   a first side two-axis sensor;
   a second side two-axis sensor;
   a control unit which determines whether the vehicle is in a front collision situation by calculating an average value of first and second acceleration values measured by the first and second side two-axis sensors, respectively, or determines whether the vehicle is in a broadside collision situation by calculating a speed and a speed change of the first side two-axis sensor using a third acceleration value and by calculating a speed of the second side two-axis sensor using a fourth acceleration value; and
   a protection unit which protects the person based on a result of the determination of the control unit.

2. The apparatus of claim 1, wherein the first and second acceleration values are measured by the first and second side two-axis sensors, respectively, in a first direction along which the vehicle travels, and
   wherein the control unit determines whether the vehicle is in the front collision situation using the average value and fifth and sixth acceleration values measured by the front two-axis sensor in the first direction and a second direction, respectively, the second direction being perpendicular to the first direction.

3. The apparatus of claim 1, wherein the vehicle travels along a first direction and a second direction is perpendicular to the first direction, and
   wherein the control unit calculates a displacement, a speed, and a speed change of an airbag control unit (ACU) installed in the vehicle using the average value, calculates a speed change of the front two-axis sensor using fifth and sixth acceleration values measured by the front two-axis sensor in the first and second directions, respectively, and determines whether the vehicle is in the front collision situation using the displacement, the speed, and the speed change of the ACU and using the speed change of the front two-axis sensor.

4. The apparatus of claim 1, wherein the control unit calculates a displacement, a speed, and a speed change of an airbag control unit (ACU) installed in the vehicle using the average value, calculates a first threshold value and a second threshold value using the displacement of the ACU, the first threshold value and the second threshold value being associated with the speed and the speed change of the ACU, respectively, calculates a difference in moving average values of acceleration between the first side two-axis sensor and the second side two-axis sensor, and determines that the vehicle is in the front collision situation when the speed of the ACU is equal to or higher than the first threshold value, the speed change of the ACU is equal to or higher than the second threshold value, and the difference in moving average values is lower than a predetermined safing threshold value.

5. The apparatus of claim 1, wherein the control unit calculates a displacement, a speed, and a speed change of an airbag control unit (ACU) installed in the vehicle using the average value, calculates a first of a first threshold value and a second of the first threshold value using the displacement of the ACU, the first threshold value being associated with the speed of the ACU, calculates a first of a second threshold value and a second of the second threshold value using the displacement of the ACU, the second threshold value being associated with the speed change of the ACU, calculates an X-axis threshold value in a first direction along which the vehicle travels and a Y-axis threshold value in a second direction perpendicular to the first direction using the displacement of the ACU, the X-axis and Y-axis threshold values being associated with the speed change of the front two-axis sensor, and determines whether the vehicle is in the front collision situation.

6. The apparatus of claim 5, wherein the control unit sets the first threshold value and the second threshold value as the first of the first threshold value and the first of the second threshold value, respectively, when an X-axis speed change of the front two-axis sensor is equal to or higher than the X-axis threshold value, and a Y-axis speed change of the front two-axis sensor is equal to or higher than the Y-axis threshold value, and
   wherein the control unit sets the first threshold value and the second threshold value as the second of the first threshold value and the second of the second threshold value, respectively, when the X-axis speed change of the front two-axis sensor is lower than the X-axis threshold value or the Y-axis speed change of the front two-axis sensor is lower than the Y-axis threshold value, or both.

7. The apparatus of claim 1, wherein the control unit calculates a speed and a speed change of the first side two-axis sensor using the third acceleration value in a first direction measured by the first side two-axis sensor, calculates a speed of the second side two-axis sensor using the fourth acceleration value measured in the first direction by the second side two-axis sensor, the first direction being perpendicular to a second direction along which the vehicle travels, and determines whether the vehicle is in the broadside collision situation, using the speed and the speed change of the first side two-axis sensor and the speed of the second side two-axis sensor.

8. The apparatus of claim 1, wherein the control unit calculates a speed and a speed change of the first side two-axis sensor using the third acceleration value in a first direction measured by the first side two-axis sensor, calculates a speed of the second side two-axis sensor using the fourth acceleration value measured by the second side two-axis sensor in the first direction, the first direction being perpendicular to a second direction along which the vehicle travels, calculates first and second threshold values using the speed of the second side two-axis sensor, the first and second threshold values being associated with the speed and the speed change of the first side two-axis sensor, respectively, and determines that the vehicle is in the broadside collision situation when the speed and the speed change of the first side two-axis sensor are equal to or higher than the first and second threshold values, respectively, and an average value of deceleration of the front two-axis sensor or an average value of deceleration of the second side two-axis sensor is greater than a predetermined safing threshold value.

9. A method of protecting a person in a vehicle, the method comprising:
   measuring a plurality of acceleration values using a front two-axis sensor, a first side two-axis sensor, and a second side two-axis sensor, the plurality of acceleration values including first, second, third, fourth, fifth, and sixth acceleration values;
   calculating an average value of the first and second acceleration values measured by the first and second side two-axis sensors, respectively, or calculating a speed and a speed change of the first side two-axis sensor using the third acceleration value and a speed of the second side two-axis sensor using the fourth acceleration value, the third and fourth acceleration values being measured by the first and second side two-axis sensor, respectively;

determining whether the vehicle is in a front collision situation, using the calculated average value and the fifth and sixth acceleration values measured by the front two-axis sensor, or determining whether the vehicle is in a broadside collision situation, using the calculated speed and the calculated speed change of the first side two-axis sensor and the calculated speed of the second side two-axis sensor; and protecting the person based on a result of the determination.

10. The method of claim 9, wherein the first and second acceleration values are measured by the first and second side two-axis sensors, respectively, in a first direction along which the vehicle travels, a second direction being perpendicular to the first direction, and wherein the fifth and sixth acceleration values are measured by the front two-axis sensor in the first and second directions, respectively.

11. The method of claim 9, wherein the vehicle travels along a first direction and a second direction is perpendicular to the first direction, the method further comprising:

calculating a displacement, a speed, and a speed change of an airbag control unit (ACU) installed in the vehicle using the average value;

calculating a speed change of the front two-axis sensor using the fifth and sixth acceleration values measured by the front two-axis sensor in the first and second directions, respectively, and determines whether the vehicle is in the front collision situation, using the displacement, the speed, and the speed change of the ACU, and the speed change value of the front two-axis sensor.

12. The method of claim 9, further comprising:

calculating a displacement, a speed, and a speed change of an airbag control unit (ACU) installed in the vehicle using the average value;

calculating a first threshold value and a second threshold value using the displacement of the ACU;

calculating a difference in moving average values of acceleration of the first side two-axis sensor and the second side two-axis sensor, and determines that the vehicle is in the front collision situation when the speed of the ACU is equal to or higher than the first threshold value, the speed change of the ACU is equal to or higher than the second threshold value, and the difference in moving average values is lower than a predetermined safing threshold value.

13. The method of claim 9, further comprising:

calculating a displacement, a speed, and a speed change of an airbag control unit (ACU) installed in the vehicle using the average value;

calculating a first of a first threshold value and a second of the first threshold value using the displacement of the ACU, the first threshold value being associated with the speed of the ACU;

calculating a first of a second threshold value and a second of the second threshold value using the displacement of the ACU, the second threshold value being associated with the speed change of the ACU;

calculating an X-axis threshold value in a first direction along which the vehicle travels and a Y-axis threshold value in a second direction perpendicular to the first direction using the displacement of the ACU, the X-axis and Y-axis threshold values being associated with the speed change of the front two-axis sensor.

14. The method of claim 13, further comprising:

setting the first threshold value and the second threshold value as the first of the first threshold value and the first of the second threshold value, respectively, when an X-axis speed change of the front two-axis sensor is equal to or higher than the X-axis threshold value, and a Y-axis speed change of the front two-axis sensor is equal to or higher than the Y-axis threshold value;

setting the first threshold value and the second threshold value as the second of the first threshold value and the second of the second threshold value, respectively, when the X-axis speed change of the front two-axis sensor is lower than the X-axis threshold value or the Y-axis speed change of the front two-axis sensor is lower than the Y-axis threshold value, or both.

15. The method of claim 9, further comprising:

calculating a speed and a speed change of the first side two-axis sensor using the third acceleration value measured by the first side two-axis sensor in a first direction, the first direction being perpendicular to a second direction along which the vehicle travels;

calculating a speed of the second side two-axis sensor using the fourth acceleration value in the first direction measured by the second side two-axis sensor; and determining whether the vehicle is in the broadside collision situation, using the speed and the speed change of the first side two-axis sensor and the speed of the second side two-axis sensor.

16. The method of claim 9, further comprising:

calculating a speed and a speed change of the first side two-axis sensor using the third acceleration value in a first direction measured by the first side two-axis sensor, the first direction being perpendicular to a second direction along which the vehicle travels;

calculating a speed of the second side two-axis sensor using the fourth acceleration value measured by the second side two-axis sensor;

calculating first and second threshold values using the speed of the second side two-axis sensor, the first and second threshold values being associated with the speed and the speed change of the first side two-axis sensor, respectively; and determining that the vehicle is in the broadside collision situation when the speed and the speed change of the first side two-axis sensor are equal to or higher than the first and second threshold values, respectively, and an average value of deceleration of the front two-axis sensor or an average value of deceleration of the second side two-axis sensor is greater than a predetermined safing threshold value.

* * * * *